United States Patent [19]
Ito

[11] Patent Number: 5,373,349
[45] Date of Patent: Dec. 13, 1994

[54] COPYING MACHINE CONTROL SYSTEM WITH COMMUNICATION STATES WITH CONTROL CENTER BEING DISPLAYED

[75] Inventor: Hideo Ito, Toyokawa, Japan

[73] Assignee: Minolta Camera Kabushiki Kaisha, Osaka, Japan

[21] Appl. No.: 987,791

[22] Filed: Dec. 9, 1992

[30] Foreign Application Priority Data

Dec. 10, 1991 [JP] Japan ................... 3-350168

[51] Int. Cl.⁵ .......................................... G03G 21/00
[52] U.S. Cl. ...................... 355/202; 355/200; 355/203; 355/205; 355/206; 358/434; 358/438; 358/439; 371/164; 371/29.1
[58] Field of Search ............. 355/200, 202–206, 355/208, 209, 207; 358/434, 438, 439, 404, 441, 444, 437; 371/29.1; 379/106; 364/184–186

[56] References Cited

U.S. PATENT DOCUMENTS

| | | | |
|---|---|---|---|
| 3,997,873 | 12/1976 | Thornton | 355/201 X |
| 4,167,322 | 9/1979 | Yano et al. | 355/204 X |
| 4,361,851 | 11/1982 | Asip et al. | 358/84 |
| 4,390,953 | 6/1983 | Johnstone | 379/106 X |
| 4,497,037 | 1/1985 | Kato et al. | 355/202 X |
| 4,509,851 | 4/1985 | Ippolito et al. | 355/204 |
| 4,549,044 | 10/1985 | Durham | 379/106 X |
| 4,583,834 | 4/1986 | Seko et al. | 355/206 |
| 4,766,548 | 8/1988 | Cedroue et al. | 379/106 X |
| 4,797,706 | 1/1989 | Sugishima et al. | 355/200 X |
| 4,965,676 | 10/1990 | Ejiri et al. | 358/404 X |
| 4,970,599 | 11/1990 | Nobuta | 358/296 |
| 4,979,132 | 12/1990 | Sugimoto | 395/101 X |
| 4,994,926 | 2/1991 | Gordon et al. | 358/434 X |
| 4,996,703 | 2/1991 | Gray | 379/106 X |
| 5,057,866 | 10/1991 | Hill, Jr. et al. | 355/200 |
| 5,061,916 | 10/1991 | French et al. | 358/441 X |
| 5,077,582 | 12/1991 | Krauette et al. | 355/206 |
| 5,084,875 | 1/1992 | Weinberger et al. | 355/205 X |
| 5,127,013 | 6/1992 | Yoshida | 358/404 X |
| 5,177,620 | 1/1993 | Fukushima | 358/404 |
| 5,208,682 | 5/1993 | Ahmed | 358/437 X |
| 5,270,834 | 12/1993 | Kuwahara | 358/440 |
| 5,278,664 | 1/1994 | Jang | 358/440 |
| 5,291,244 | 3/1994 | Kajiwara et al. | 355/202 |
| 5,293,196 | 3/1994 | Kaneko et al. | 355/200 |
| 5,294,999 | 3/1994 | Kuwahara | 358/434 X |
| 5,305,055 | 4/1994 | Ebner et al. | 355/200 |
| 5,321,741 | 6/1994 | Kaneko et al. | 379/100 |
| 5,323,246 | 6/1994 | Kotani et al. | 358/434 |
| 5,325,156 | 6/1994 | Ulinski | 355/204 X |
| 5,325,425 | 6/1994 | Novas et al. | 379/100 |
| 5,333,286 | 7/1994 | Weinberger et al. | 355/202 X |
| 5,335,048 | 8/1994 | Takano et al. | 355/204 |

FOREIGN PATENT DOCUMENTS

| | | | |
|---|---|---|---|
| 0046407 | 4/1979 | Japan | 358/404 |
| 0087961 | 5/1983 | Japan | 358/441 |
| 0142559 | 8/1984 | Japan | . |
| 0158169 | 9/1984 | Japan | 358/437 |
| 0005661 | 1/1985 | Japan | 358/444 |
| 0081970 | 5/1985 | Japan | 358/437 |
| 0090460 | 5/1985 | Japan | 379/106 |

OTHER PUBLICATIONS

*Research Newsletter*, Dataquest, "Remote Diagnostics–Tool Kit of the Future", 1989, pp. 1–6.

Primary Examiner—Matthew S. Smith
Attorney, Agent, or Firm—Burns, Doane, Swecker & Mathis

[57] ABSTRACT

A copying machine executing a processing for connecting a control center and a communication line by activating a modem when a trouble is detected, and transmitting data related to the trouble to the centralized control unit of the control center after the connection of the communication line is made, the machine includes a display apparatus, a communication control apparatus for monitoring the communication state of the modem, a memory in which data for display corresponding to each communication state is stored, display control apparatus for reading data for display corresponding to a communication state monitored by the communication control apparatus from the memory when a trouble is detected, and controlling the display apparatus to display the data.

8 Claims, 16 Drawing Sheets

FIG. 5

| b7 | b6 | b5 | b4 | b3 | b2 | b1 | b0 |
|----|----|----|----|----|----|----|----|

DISCHARGE CODE: DISCHARGE 1 SHEET = FALLING OF $b_0$

JAM CODE: $b_7 = 1$, $b_6 = 0$

TROUBLE CODE: $b_7 = 1$, $b_6 = 1$

FIG.6

| DISPLAY CODE | DISPLAYED MESSAGE |
|---|---|
| 1 | PLEASE WAIT |
| 2 | COPY AVAILABLE |
| 3 | SUPPLY PAPER |
| 4 | SUPPLY TONER |
| ⋮ | ⋮ |
| 31 | TROUBLE OCCURED |
| 32 | AUTOMATIC TRANSMISSION TO SERVICE CENTER |
| 33 | IN ON LINE STATE WITH SERVICE CENTER NOW |
| 34 | SERVICE MAN EXPECTED TO ARRIVE AT ○○ : ○○ , PLEASE WAIT |
| 35 | AUTOMATIC TRANSMISSION TO SERVICE CENTER NOT AVAILABLE. MAKE SERVICE CALL TO ○○○-○○○○ |
| ⋮ | ⋮ |

COPYING MACHINE CONTROL SYSTEM WITH COMMUNICATION STATES WITH CONTROL CENTER BEING DISPLAYED

BACKGROUND OF THE INVENTION

1. Field of the Invention

The present invention relates generally to copying machines, and more specifically, to a copying machine having a function of calling a control center by automatically activating a communication terminal such as a modem when a trouble is detected, and transmitting data related to the trouble after a connection with the control center is made.

2. Description of the Related Art

A system of controlling a plurality of copying machines is disclosed in U.S. Pat. No. 4,583,834. In the disclosed system, various kinds of information on copying machines such as the total number of copies, troubles, the remaining amounts of copy sheets and toner is transmitted to a computer. The computer processes the transmitted information and feeds back instructions to the copying machines.

According to such a system, a plurality of copying machines supplied to users are connected to a centralized control unit through a communication network such as telephone lines for remote control of the copying machines. The centralized control unit is provided at an administrators place and the administrator receives information transmitted from each of the copying machines with the centralized control unit. Then, various administrative works are done such as issuance of bills corresponding to the numbers of copies and dispatch of servicemen to cope with troubles.

Since a general copying machine does not have a function of communicating with a centralized control unit through a communication network, a data terminal is attached to a copying machine for communication when such a system is constructed. The data terminal collects various kinds of information from the copying machine and communicates with the centralized control unit based on the collected information.

The data terminal calls the centralized control unit when a trouble occurs in the copying machine, but a communication is not necessarily executed. For example, if the data terminal is defective or the communication line is busy, a communication between the data terminal and the centralized control unit can not be executed. Meanwhile, believing that the occurrence of a trouble in the copying machine is automatically reported to the centralized control unit from the data terminal, the user does not contact the administrator right away. Accordingly, it some times takes a long time before the administrator is informed of the trouble in the copying machine.

Conversely, it is useless for the user to report to the administrator if the data terminal has reported the occurrence of the trouble to the centralized control unit.

SUMMARY OF THE INVENTION

It is an object of the invention to provide a copying machine capable of notifying a user of the state of communication with a centralized control unit.

Another object of the invention is to provide a copying machine control system capable of notifying a user of the state of communication between a copying machine and a centralized control unit.

Yet another object of the invention is to provide a copying machine control system capable of notifying a user of the state of communication between a copying machine and a centralized control unit and additional information from the centralized control unit.

In order to achieve the above-stated objects, an image forming apparatus in accordance with the invention which is controlled by a centralized control unit in a remote site through a communication network includes display means for displaying a message, communication means for calling the centralized control unit when prescribed transmission conditions are satisfied, monitoring means for monitoring the state of communication between the communication means and the centralized control unit, storage means for storing a plurality of messages corresponding to the kinds of states of communication between the communication means and the centralized control unit, and control means for reading out a corresponding message stored in the storage means in response to the state of communication monitored by the monitoring means and making the display means display the message.

Since thus structured image forming apparatus permits a message corresponding to the monitored state of communication to be displayed, the user can take appropriate measures according to the state of communication.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a representation for use in illustration of codes to be transmitted to a CPU 11 in a DT from the CPU 41 of the copying machine shown in FIG. 1;

FIG. 6 is a representation showing examples of messages displayed in the message block in FIG. 4;

DESCRIPTION OF THE PREFERRED EMBODIMENTS

One embodiment of the invention will now be described.

[1] Structure of System

The structure of a system formed of "copying machine • data terminal (DT) • communication network • center" will be described.

Figure 1:
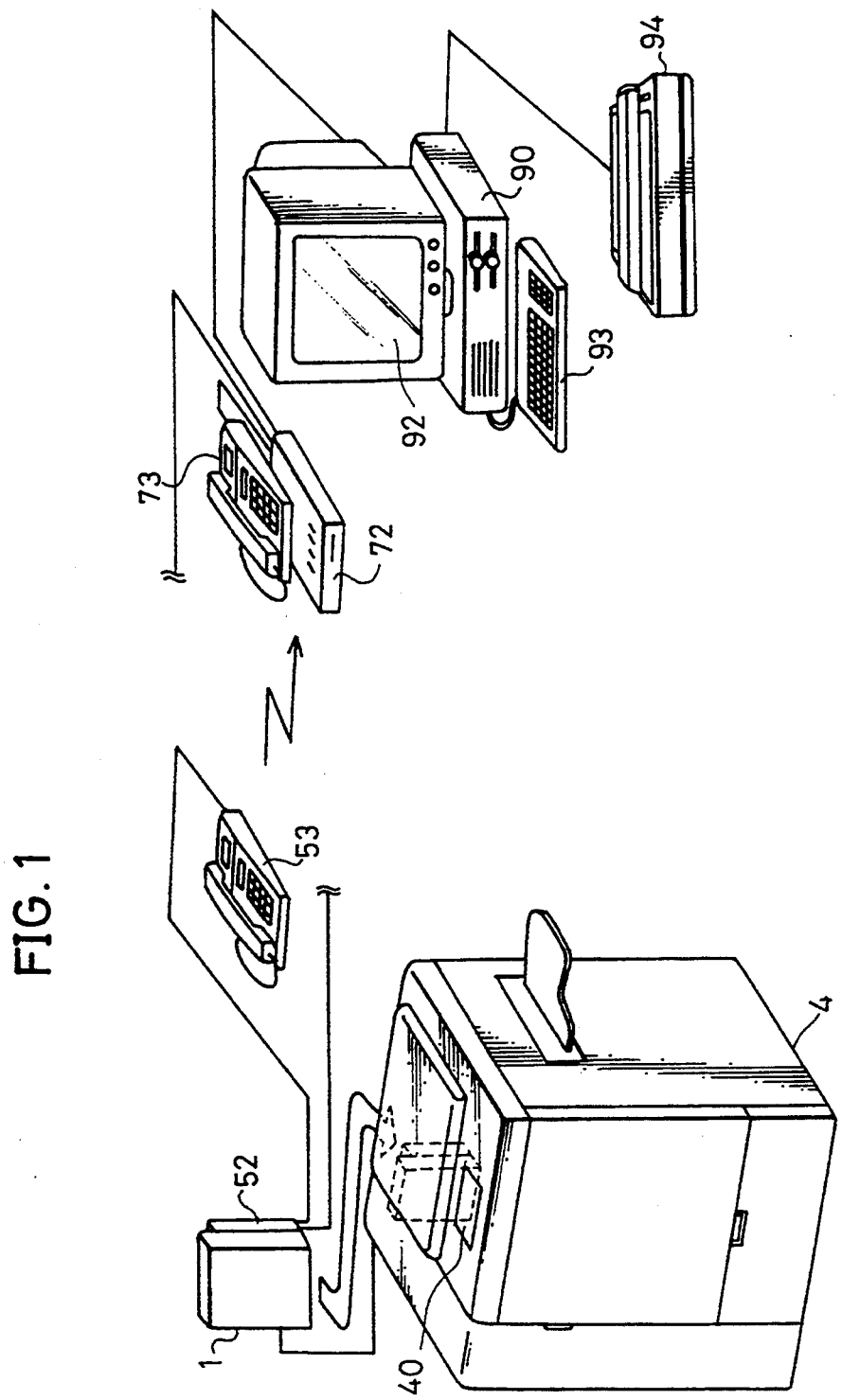
FIG. 1 is a view schematically showing the structure of a copying machine control system in accordance with one embodiment of the invention.
Figure 2:
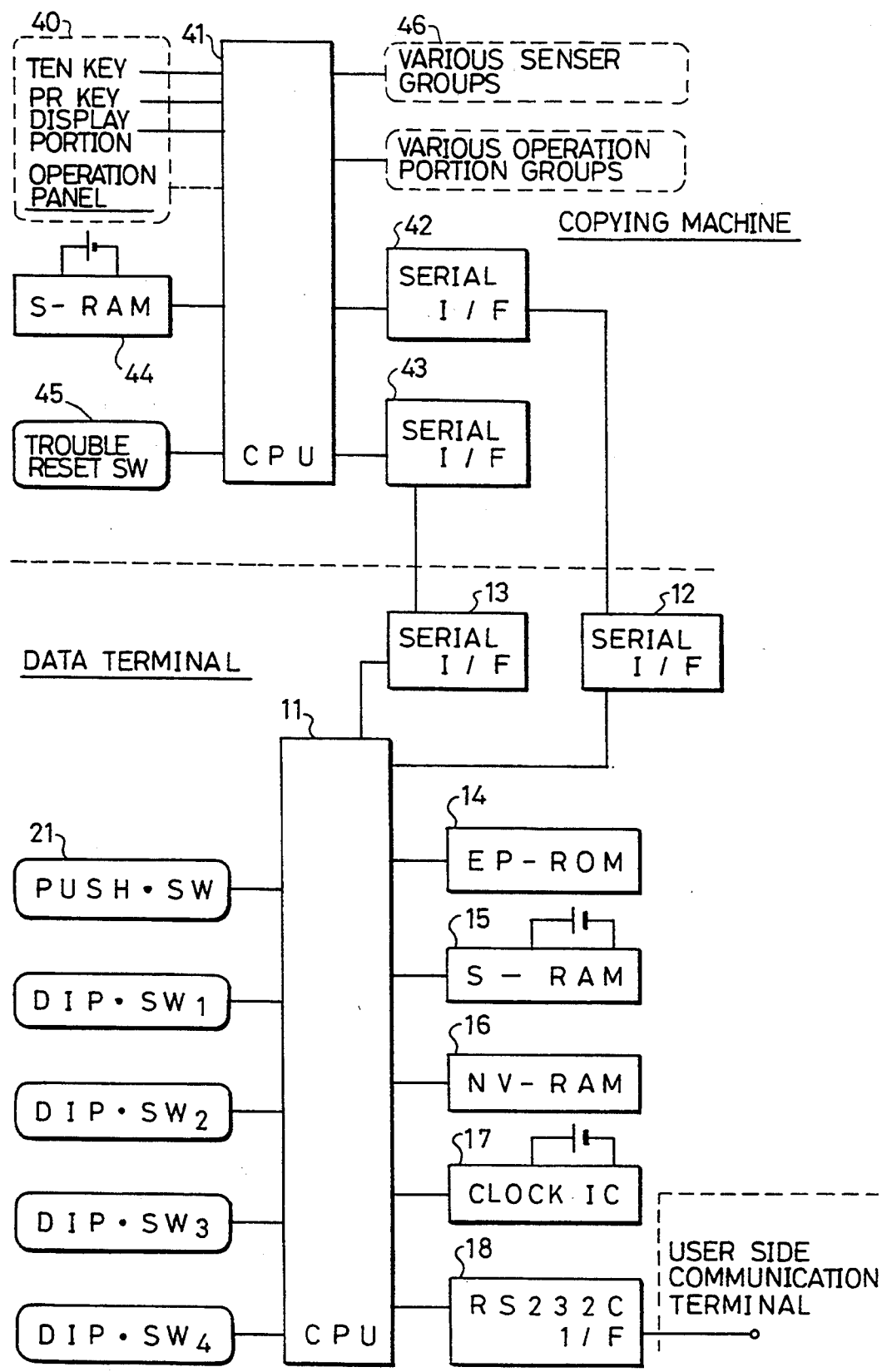
FIG. 2 is a part of a block diagram showing the circuit configuration of the system shown in FIG. 1.
Figure 3:
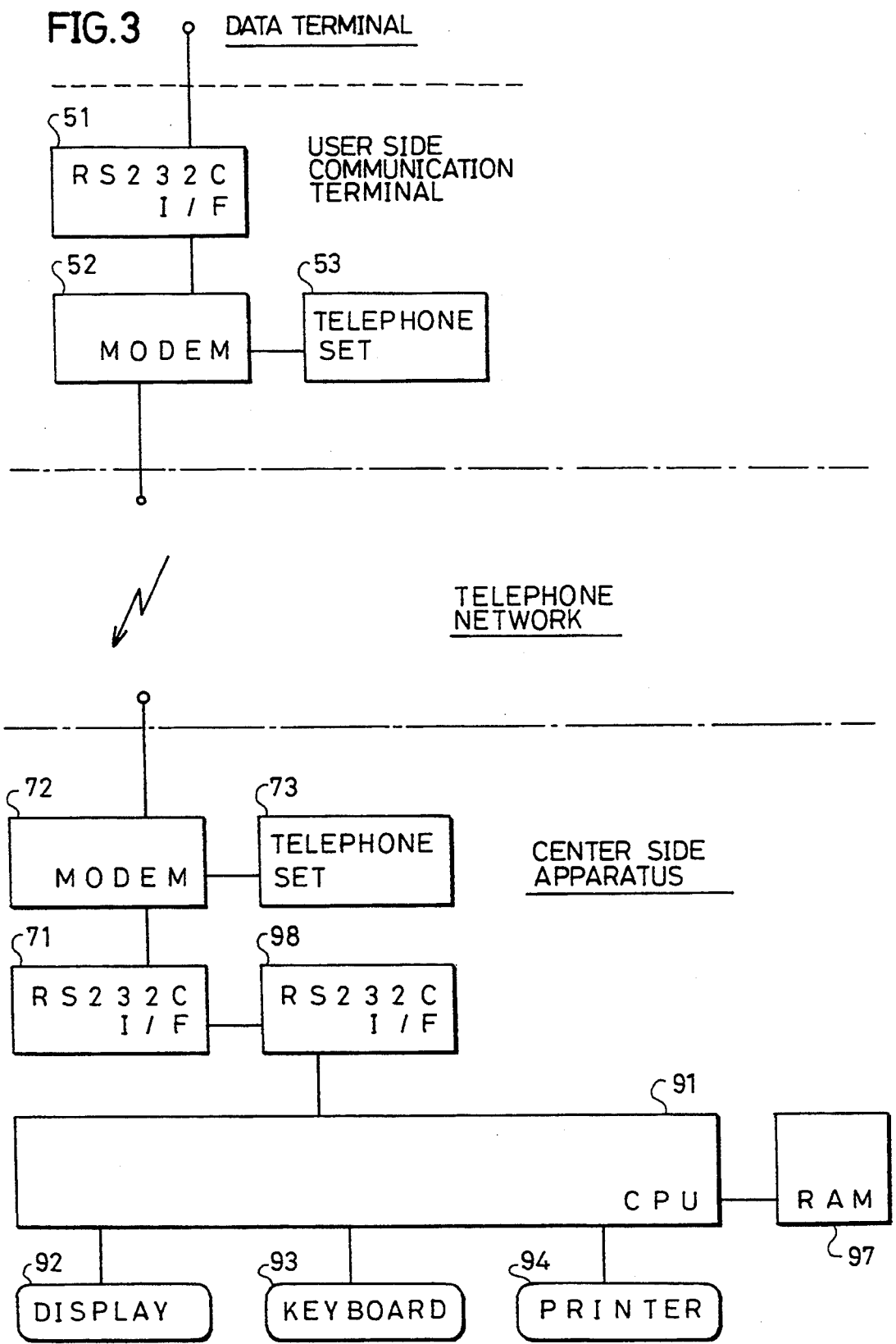
FIG. 3 is the remaining part of the block diagram showing the circuit configuration of the system shown in FIG. 1.

FIG. 1 is a view illustrating the structure of the system, and FIGS. 2 and 3 are block diagrams each showing the circuit configuration of the system. The system includes a user side apparatus (one user apparatus among a number of users will be described by way of illustration), an apparatus on the center side which is an administrator, and a communication network for connecting them.

The user side is provided with a copying machine 4, a data terminal 1, a modem 52 having a function as a communication terminal apparatus, and a telephone set 53 which is a usual communication equipment.

On the side of the administrator, a modem 72 having a function as a communication terminal apparatus, a telephone set 73 which is a usual communication equipment, and a computer 90 are provided and connected with each other. A CPU 91 is installed in the computer 90, and a display 92, a keyboard 93, a printer 94, a RAM 97, etc. are connected to the CPU 91.

The data terminal 1 is an apparatus for accepting various kinds of information on a corresponding copying machine 4 from time to time, subjecting the information to prescribed processings, and transmitting data on the copying machine 4 to the computer 90 on the side of the center. Transmission to the center side is made periodically and temporarily when a trouble occurs.

The computer 90 on the center side, based on data transmitted from each data terminal 1 of each user, conducts processings for controlling a copying machine 4 corresponding to the data terminal 1. For example, when trouble information is transmitted thereto, scheduled time for dispatching a serviceman, etc. is returned to the data terminal 1, and an instruction to the serviceman is output.

Now, description will be provided on various apparatuses.

[Copying Machine 4]

The copying machine 4 scans an original image and forms a copy image on paper.

In the copying machine 4, various kinds of element data which have effects on an image forming process (such as time required for conveying paper, the potential of the surface of a photoreceptor drum, the concentration of toner in a developer, the amount of exposure of the photoreceptor drum, a developing bias voltage, the amount of toner sticking onto the photoreceptor drum, the grid voltage of a corona charger), and various kinds of trouble data (such as an exposure lamp being defective, a heater being defective, the abnormal discharge of a charge wire, and other abnormalities which need service maintenance) are detected by various sensor groups 46 disposed in various positions in the copying machine 4, and the data is accepted into the CPU 41 and then transmitted to the CPU 11 of the data terminal 1 through a serial I/F 43 and a serial I/F 13.

In the CPU 41 of the copying machine 4, the count values of counters based on which a charge amount is calculated on the center side (total counter indicating the number of paper discharge, a counter for separate paper sizes indicating the number of paper used for separate sizes), and the count values of counters which are used as criteria in maintenance (a separate position JAM counter indicating the number of JAMs for each position, a separate position trouble counter indicating the number of troubles for each position, a separate parts PM counter indicating the number of use for every part) are calculated and transmitted to the CPU 11 of the data terminal 1 through a serial I/F 42 and a serial I/F 12.

Signals are input to the CPU 41 of the copying machine 4 from the various key switch groups disposed on an operation panel 40 (see FIG. 4) (a print key 40a for instructing initiation of a copying operation, a ten key group 40b for inputting values, a clear • stop key 40c for instructing clearing of an input, a function key group 40d, etc), and various switch groups (a trouble reset switch for instructing resetting of a trouble, etc.), and based on the input signals, corresponding operations/modes are set.

The CPU 41 outputs a signal for activating a graphic display panel 400 of LCD on the operation panel 40.

The graphic display panel 400 is provided with a message block 400x displaying the condition of a copying machine such as copy prohibited, paper/toner being empty, etc., a copy mode block 400y displaying conditions at the time of copying such as the number of copies, paper size, copy concentration, copy magnification, the state of setting create, etc., and a multi-function block 400z for setting an automatic paper selection, an automatic magnification selection, a zoom magnification, create, a copy concentration, etc. in combination with operations of the function key group 40d by an inquiry mode operation.

Various messages shown in FIG. 6 are displayed in the message block 400x depending upon the state of copying machine 4, and after a trouble occurs, messages after the display code 31 shown in FIG. 6 will be sequentially displayed depending upon the state of communication in the modem 52 activated by the data terminal 1. How such display is made will be later described.

In an RAM 44 connected to the CPU 41, the model name and serial number of a copying machine 4 is stored when the machine is transferred from the factory, and the data is transmitted to the side of CPU 11 through a serial I/F 42 and a serial I/F 12 in response to a transmission request from the CPU 11 when the data terminal 1 is installed. The display messages (see FIG. 6) are also stored in the RAM 44.

[Data Terminal 1]

The data terminal 1 accepts and processes data on a copying machine 4, connects a communication line with the center side by activating the modem 52 when prescribed transmission conditions (by which one of transmission flags is set to "1": which will be later described), and transmits data for control related to the copying machine 4 (the above-stated element data, count data, trouble code data or the like) to the CPU 91 of the center.

Accordingly, the CPU 11 of the data terminal 1 is connected to the modem 52 which is a communication terminal apparatus, through a communication I/F (RS232CI/F) 18 and the communication I/F (RS232CI/F) 51 of the modem 52, and the modem 52 is connectable to the modem 72 of the center through a public telephone line.

Figure 13:
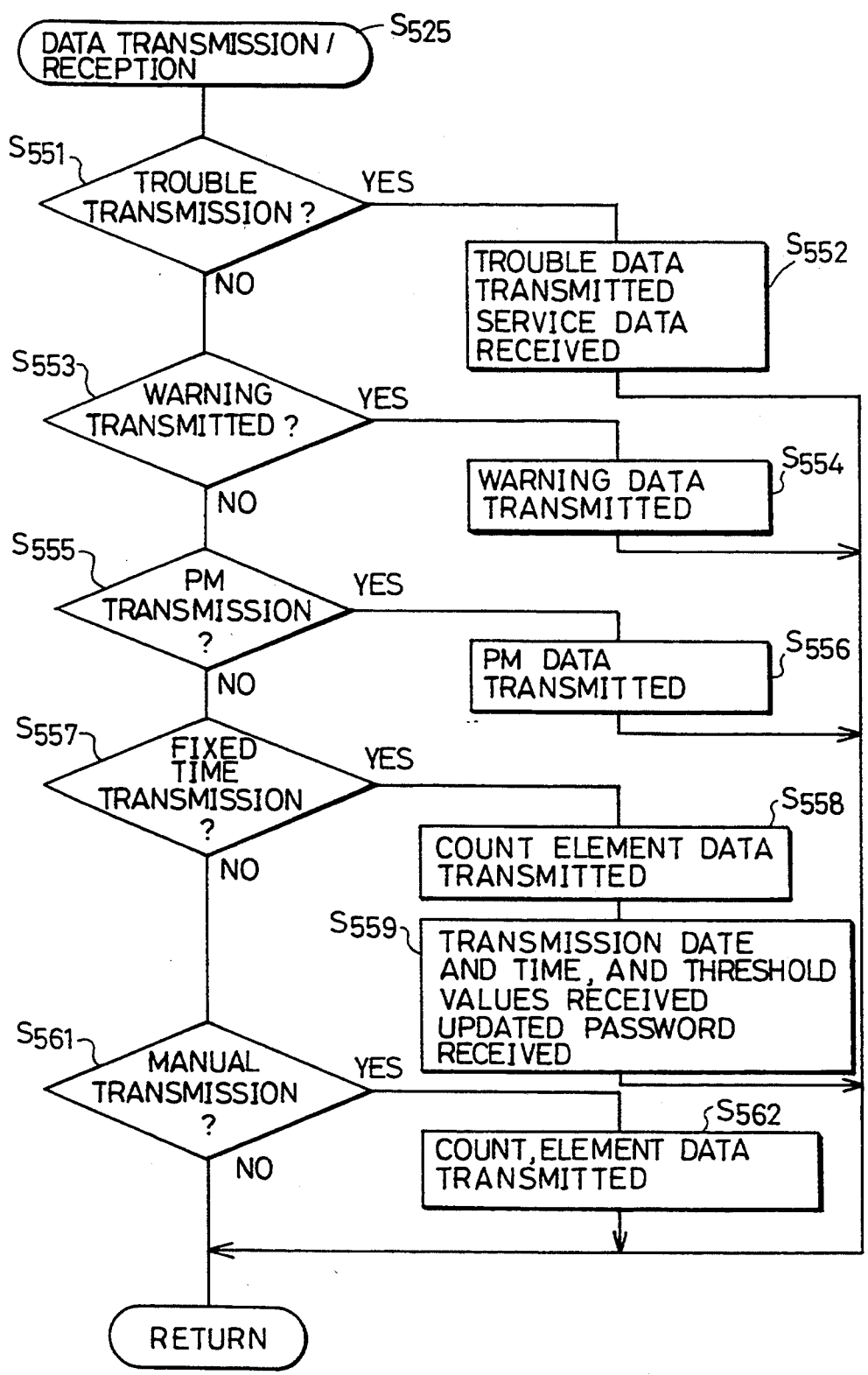
FIG. 13 is a flow chart showing the specific content of a data transmission/reception processing routine in FIG. 11.

The contents of data (data for controlling the copying machine 4) to be transmitted to the CPU 91 of the center from the CPU 11 through a communication line is decided based on which flag is set to "1" (see FIG. 13). For example, if it is in the case of a trouble transmission, data indicating the kind of the trouble (trouble data) is transmitted. If it is an initialization transmission when the apparatus is installed, the identification data of the copying machine 4 (model name/serial number), the identification data of the data terminal 1 (DTID) and the like are transmitted. If it is a fixed time transmission which is executed periodically, data for control is transmitted/received.

An ROM 14 in which control programs are stored, a non-volatile memory 16 in which numeral data, etc. are stored, a battery-backed up RAM 15 for various operations, a battery-backed up clock IC 17 and the like are connected to the CPU 11. The CPU 11 is also connected to the CPU 41 through the serial I/F 12 and the serial I/F 42, and the serial I/F 13 and the serial I/F 43, whereby data transmitted from the CPU 41 is input into the CPU 11 and processed in the above-stated manner.

8-bit data $b_7$–$b_0$ transmitted from the CPU 41 of the copying machine 4 to the CPU 11 through the serial I/F 12 is formed as shown in FIG. 5.

More specifically, a paper discharge code indicating paper discharge is represented by the falling edge of the bit $b_0$ (change from 1 to 0), a JAM code indicating the occurrence of a paper jam is represented by bit $b_7=1$ and bit $b_6=0$. A trouble code indicating the occurrence of various troubles is represented by bit $b_7=1$ and bit $b_6=1$. These kinds of 8-bit data is periodically input into the data terminal 1, and also input when a paper jam or a trouble takes place in the copying machine 4.

The CPU 11 is also provided with various operation switches shown in FIG. 2 (a push switch 21, and four dip switches DIP • SW1–DIP • SW4), and an initialization (see S12 in FIG. 9) is conducted in response to operations of these switches.

The dip switch DIP • SW4 is a switch for setting an initialization mode. The dip switch DIP • SW1 is for setting an input mode for the selection number (telephone number) of the center, the dip switch DIP • SW2 for an input mode for the ID number for identifying a data terminal 1 (DTID), and the dip switch DIP • SW3 for an input mode for an ID number for identifying the center (the center ID). The push switch 21 is a switch for instructing an initialization transmission or a manual transmission.

[Center]

The center is a computer apparatus formed with the CPU 91 as a key element, and the modem 72 having a function as a communication terminal is connected to the CPU 91 through the communication I/F (RS232CI/F) of the modem 72 and the communication I/F (RS232CI/F) 98 of the CPU 91. A number of user copying machines are controlled by the computer apparatus of the center through respective data terminals attached to the copying machines.

More specifically, various kinds of data (element data, count data, trouble data, etc.) transmitted from each user data terminal to the modem 72 through a telephone network, and input to the CPU 91 through the communication I/F (RS232CI/F) 71 on the side of the modem 72 and the communication I/F (RS232CI/F) on the side of the CPU 91.

Thus input data is processed at the CPU 91, and then data for controlling the copying machine connected to the data terminal is produced/updated. For example, identification data received at the time of initialization is stored in the control data area of the RAM 97. At the end of each month a charge amount is calculated based on data received, and a bill is printed out. At the time of fixed time communication, the next fixed time transmission time data and an updated password are transmitted to the data terminal. When a communication is made by a trouble transmission, time for a serviceman to visit is decided and returned to the data terminal, and an instruction to the serviceman (date and time for visit, parts to take with him, etc.) is input.

[2] Control for System

Now, control for the system will be described in order a processing in the CPU 41, a processing in the CPU 11, and a processing in the CPU 91. Prior to description, the terms "on edge" and "off edge" are defined. When the state of a switch/sensor/signal, etc. changes from an off state to an on state, the state transition is defined as "on edge". Conversely, if the state of the switch/sensor/signal, etc. changes from an on state to an off state, the state transition is defined as "off edge".

[Processing in CPU 41 in Copying Machine 4]

Figure 7:
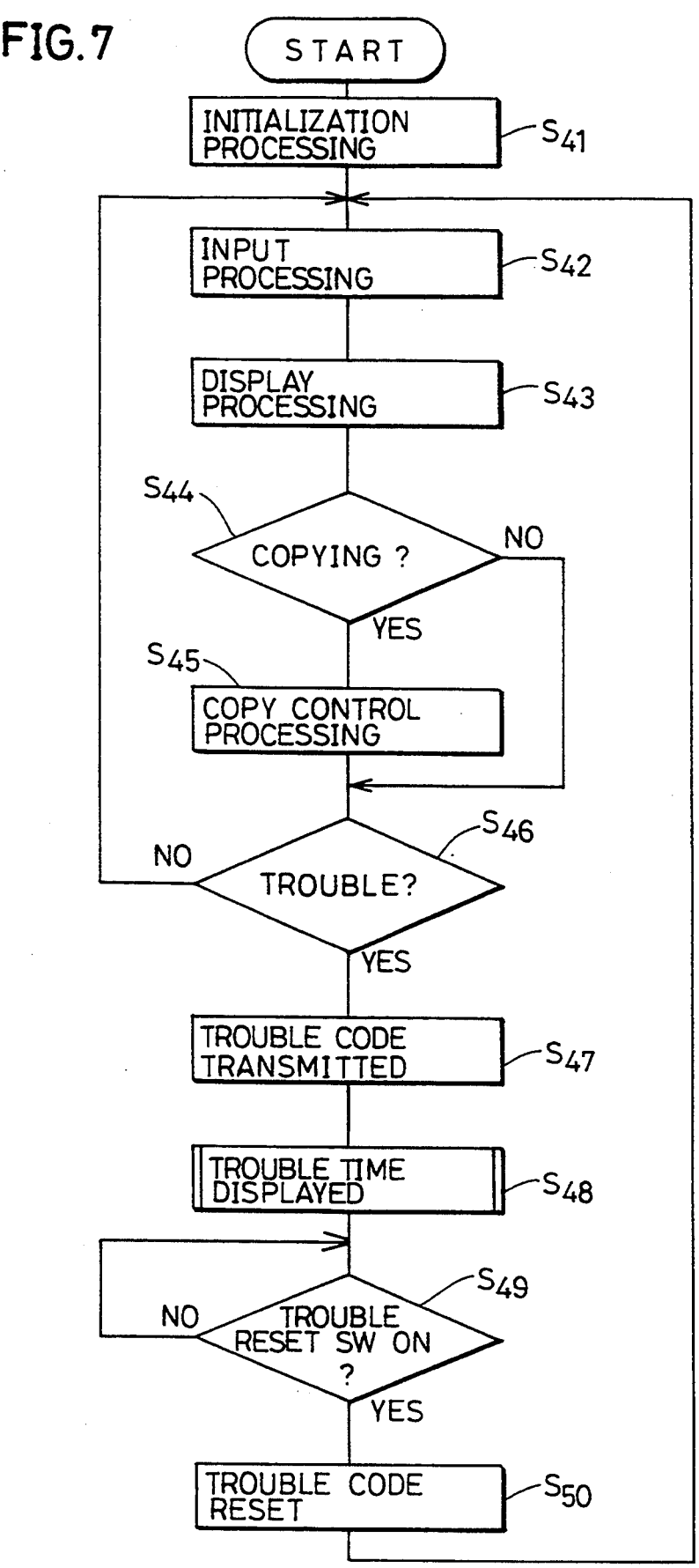
FIG. 7 is a flow chart showing a part of a main routine in a processing in a CPU in a copying machine in the system shown in FIG. 1.

A processing executed in the CPU 41 of a copying machine 4 will be described in conjunction with the flow charts in FIGS. 7–8.

In the CPU 41, a processing is initiated by, for example, turning on a power supply, and an initialization including clearing of a memory, setting a standard mode, etc. is conducted (S41). Then, a loop processing after step S42 will be repeated.

Figure 4:
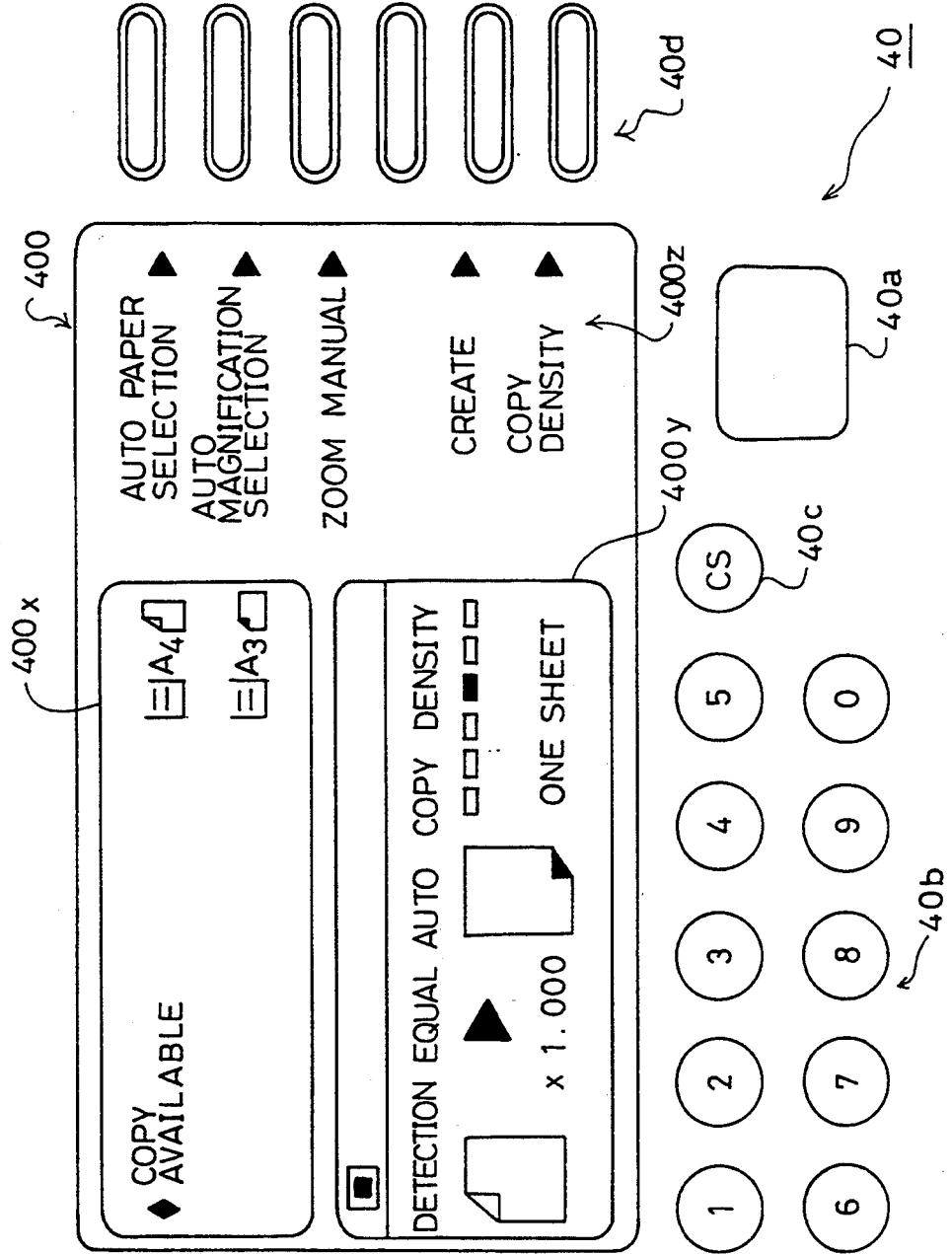
FIG. 4 is a view for use in illustration of a part of the operation panel of a copying machine in the system shown in FIG. 1.

Step S42 represents en block processings for accepting various kinds of input signals. The input signals include, for example, input signals from the key switch group on the operation panel 40, signals from sensor groups such as trouble sensors in various positions in the copying machine, and signals from the CPU 11. Step S43 represents en bloc display processings on the graphic display panel 400 on the operation panel 40 (see FIG. 4). It is noted that the message displayed in the message block 400x shown in FIG. 4 is a message in a usual (non-trouble) state.

If the copying machine 4 is in the process of a copying operation (S44;YES), various processings necessary for the copying operation are sequentially executed (S45). Herein, step S45 represents en bloc the processings necessary for the copying operation, which include control of various operation portion groups such as paper feeding control, scanning control, photoreceptor drum control, and developing apparatus control.

Meanwhile, when a JAM or other troubles (such as exposure lamp being defective, heater being defective, and abnormal discharge of a charge wire) takes place (S46;YES), a trouble signal corresponding to the trouble is transmitted to the CPU 11 of the data terminal 1 (S47). Thus, a trouble transmission is conducted in the CPU 11 (see FIGS. 10–13).

A trouble time display processing is executed as well (S48).

Figure 8:
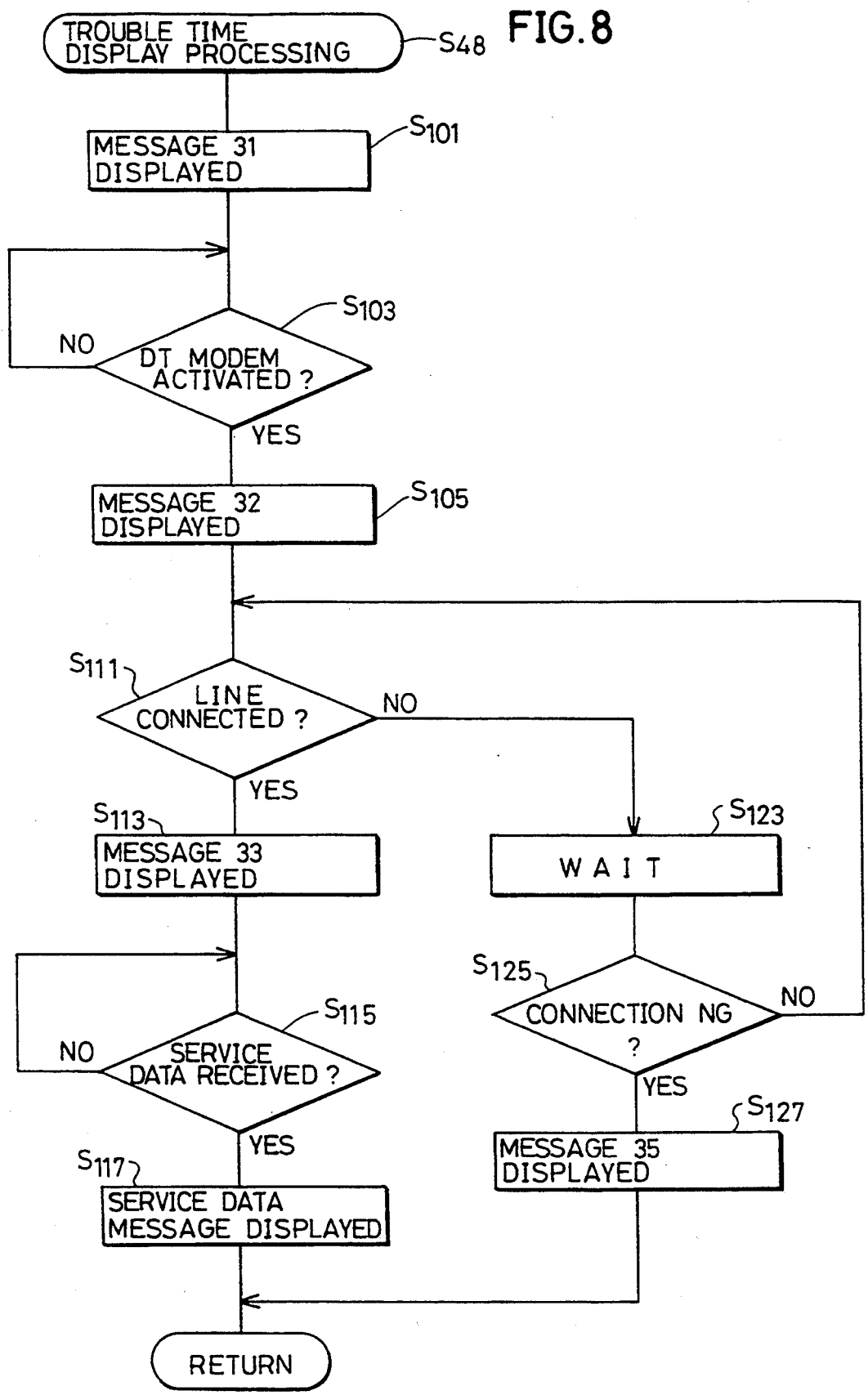
FIG. 8 is a flow chart showing the remaining part of the main routine in the processing in the CPU of the copying machine in the system shown in FIG. 1.

More specifically, as shown in FIG. 8, the message 31 "trouble has taken place" is displayed (S101).

Then, when the modem 52 is activated by the data terminal 1 (S103;YES/see S510 in FIG. 12), the message 32 "automatic transmission to service center" is displayed (S105).

Then, a communication line is connected with the modem 72 of the center, and a connection is established between the CPU 11 of the data terminal 1 and the CPU 91 of the center (S111;YES/see S522 in FIG. 11), the message 33 "now in on line state with service center" is displayed (S113).

When service data such as expected arrival time, etc. of a serviceman is received by the communication with the CPU 91 of the center (S115;YES/see S525, S531, S533 in FIG. 11 and S923 in FIG. 16), a display corresponding to the received service data, for example, the message 34 "serviceman expected to arrive at :. Please wait" is displayed (S117).

Despite redialed a prescribed number of times, if the communication line between the CPU 11 of the data terminal 1 and the CPU 91 of the center is not connected (S111;NO), and that information is transmitted from the data terminal side (S125;YES/see S543 in FIG. 11) after a prescribed time period elapses, the message 35" automatic transmission can not be made to service center. Please make service call to *-**" is displayed (S127). It is noted that the telephone number is set by an initialization by the serviceman when the apparatus is disposed.

Meanwhile, repairing, etc. is conducted and a trouble reset switch 45 is operated by the serviceman or the like (S49;YES), a trouble reset signal is transmitted to the side of CPU 11 (S50). In the CPU 11, a trouble recovery transmission is conducted (see FIGS. 10-13). The display of the message block 400x is returned to the usual display in response to the trouble reset.

[Processing in CPU 11 in Data Terminal 1]

Figure 9:
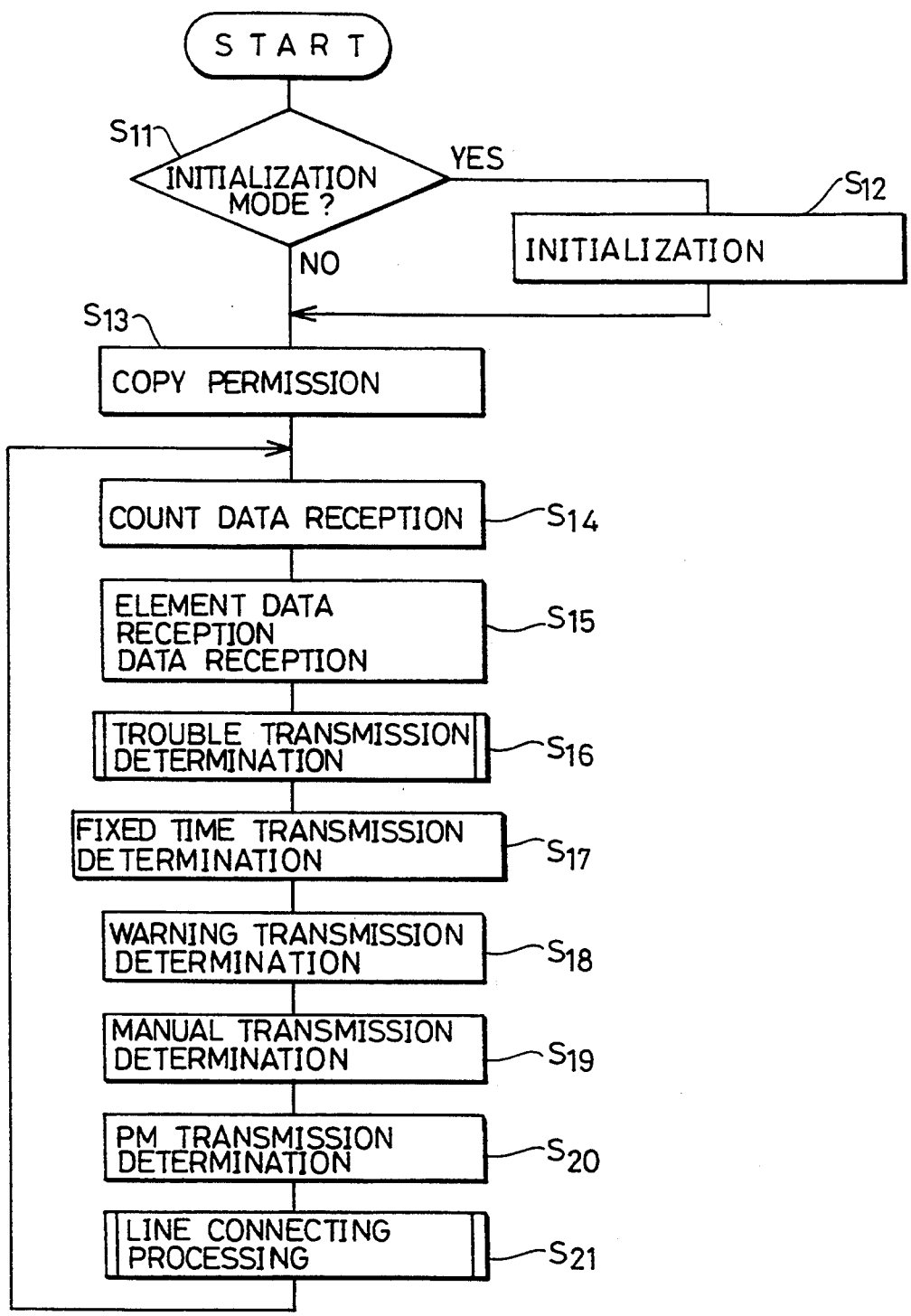
FIG. 9 is a flow chart showing a main routine in a processing in a CPU in a data terminal in the system shown in FIG. 1.

A processing executed in the CPU 11 of the data terminal 1 will now be described in conjunction with flow charts in FIGS. 9-13. FIG. 9 represents a main routine, while FIGS. 10-13 represent sub routines executed in the main routine.

(a) Main Routine

Based on the main routine in FIG. 9, the processing will be schematically described.

In the CPU 11, the processing is initiated by, for example, turning on a power supply. If an initialization mode is set (S11;YES), an initialization processing (S12) is executed, and then a copy permission signal is transmitted to the CPU 41 of the copying machine (S13). Meanwhile, if the initialization mode is not set (S11;NO), a copy permission signal is immediately transmitted (S13). After the transmission of the copy permission signal, a repetitive loop processing in steps S14-S21 is executed.

In steps S12 and S14-S21, the following processing is executed.

* Initialization Processing: S12

This processing is executed when the dip switch DIPSW4 is on at initiation of the processing, more specifically, when the initialization mode is set (S11;YES). Based on the on/off states of the dip switches DIPSW1-DIPSW3, the inputs of the center selection number (telephone number), the ID number of the data terminal (DTID) and the ID number of the center (center ID) are accepted and then an initialization transmission is executed.

* Count Data Reception Processing: S14

A reception processing for various count data transmitted from the CPU 41 is executed. The contents of the data include a discharge code, a JAM • trouble code, a JAM • trouble count value, count values for separate paper sizes, and a PM count value. In the CPU 11, these kinds of data are updated to the newest values and held therein.

* Element Data Reception/Data Processing: S15

The mean values of various element data, and data corresponding to standard deviation are operated and updated to the newest values.

* Trouble Transmission Determination Processing: S16

As will be described later, a trouble transmission flag is set to "1" in response to a trouble signal from the CPU 41 (S47), and a trouble recovery transmission flag is set to "1" in response to a trouble reset signal (S50). Thus, a trouble transmission and a trouble recovery transmission are executed (see line connecting processing).

* Fixed Time Transmission Determination Processing: S17

At prescribed fixed transmission time determined for every DT, a fixed time transmission flag is set to "1". Thus, various count data and various element data are transmitted to the center (see line connecting processing).

Figure 16:
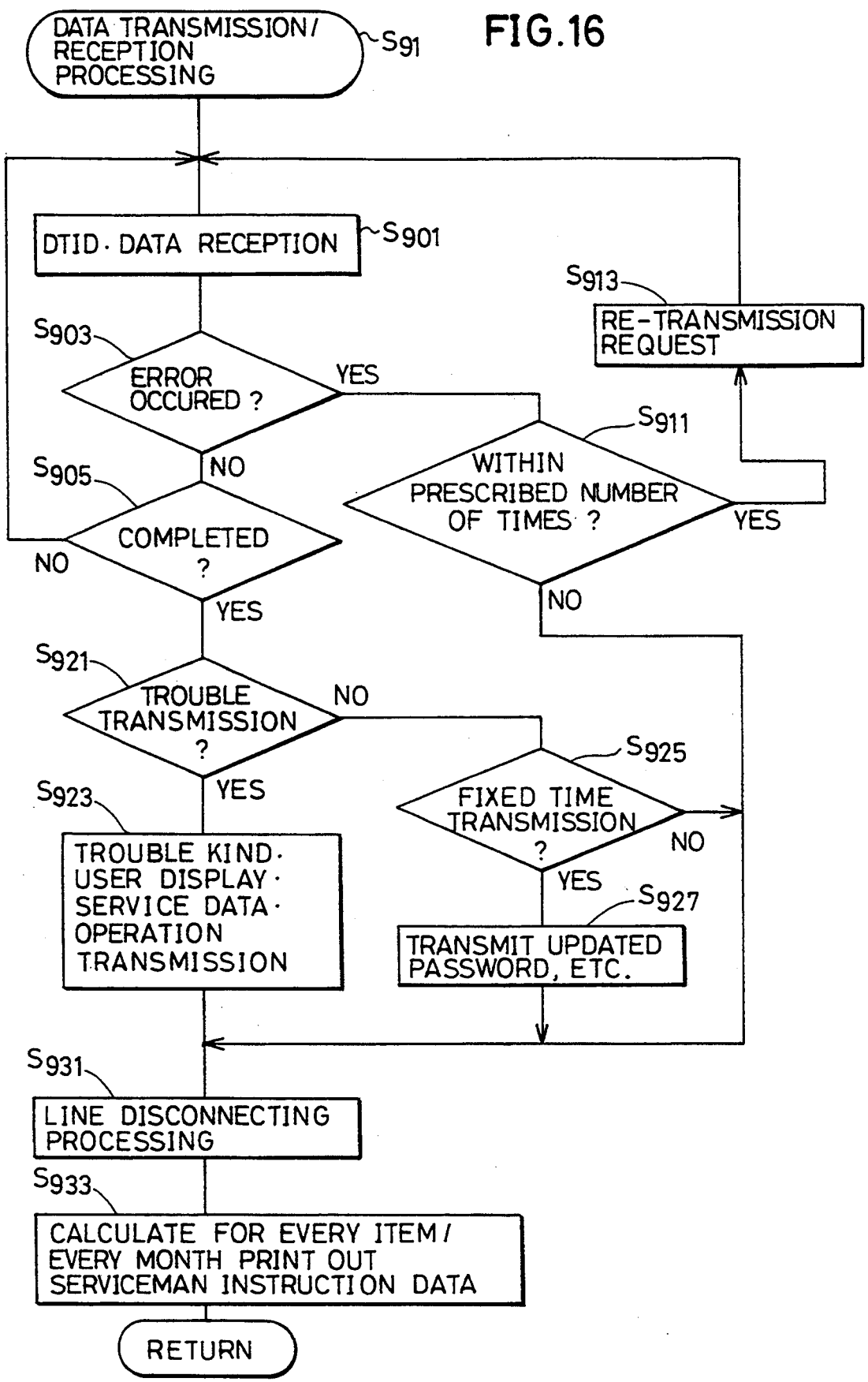
FIG. 16 is a flow chart showing the specific content of the processings in FIG. 15.

After the transmission is complete, the next fixed time transmission time data, the present time data, and due date data for a bill, and an updated password are returned from the center (see FIG. 16).

* Warning Transmission Determination Processing: S18

Element data, the count value of the JAM counter, and the count value of the PM counter are compared to corresponding prescribed threshold values.

As to each of the values, if the result of the comparison indicates that the value is not within the tolerance range, a warning transmission flag is set to "1". If the value returns within the tolerance range, a warning recovery transmission flag is set to "1". Thus, a warning transmission or a warning recovery transmission is executed (see line connecting processing).

* Manual Transmission Determination Processing: S19

In a mode other than the initialization mode if the push switch 21 is turned on, a manual transmission flag is set to "1". Thus, a manual transmission is conducted (see line connecting processing), and various element data is transmitted to the center.

* PM Transmission Determination Processing: S20

The count value of the PM counter before clearing of to "0" by parts exchange is transmitted to the center by a PM transmission.

* Line Connecting Processing: S21

As will be described later, if any of the transmission flags is set to "1", the modem 52 is activated thereby calling the center. More specifically, a processing for connecting the CPU 11 and the CPU 91 of the center is executed. After the connection of a communication line, a data communication between the CPU 11 and the CPU 91 of the center is executed, and data corresponding to the transmission flag is transmitted and received. The state of communication is also transmitted to the CPU 41.

(b) Sub Routine

Details of steps S16 (Trouble Transmission Determination Processing) and S21 (Line Connecting Processing) will now be described in conjunction with FIGS. 10-13.

Figure 10:
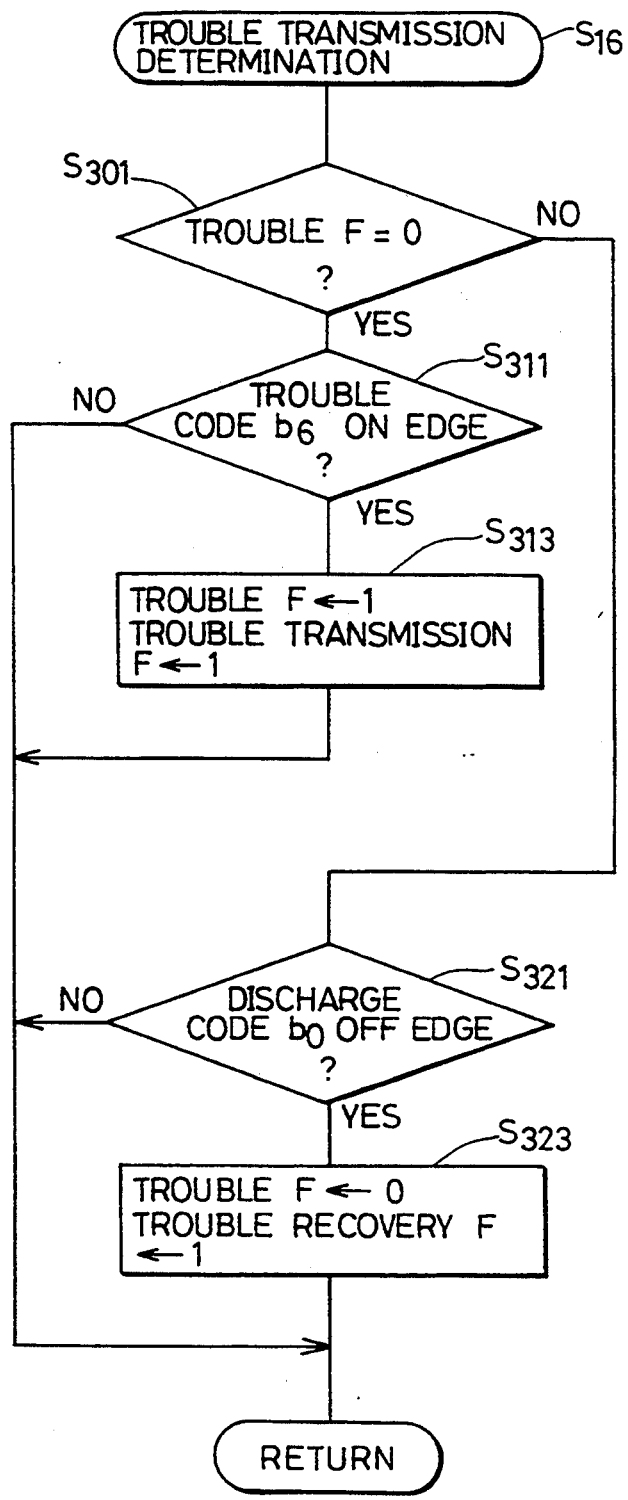
FIG. 10 is a flow chart showing the specific content of a trouble transmission determination processing routine in FIG. 9.

* Trouble Transmission Determination Processing (FIG. 10)

In this processing, the trouble transmission and the trouble recovery transmission are controlled.

For example, in the state "trouble flag=0" (S301;YES) if a trouble code from a copying machine is detected (S311;YES), the trouble flag and the trouble transmission flag are both set to "1" (S313).

In the state "trouble flag=1" (S301;NO), when a paper discharge code from a copying machine is detected (S321;YES), the trouble flag is reset to "0", and the trouble recovery transmission flag is set to "1" (S323). The flags are set in this way, because the fact that the paper is discharged in the copying machine indicates that the trouble is recovered.

Thus, when the trouble transmission flag or the trouble recovery transmission flag is set to "1", a line connecting processing (FIGS. 11-13) is executed, and trouble data or trouble recovery data is transmitted to the CPU 91 of the center.

Figure 11:
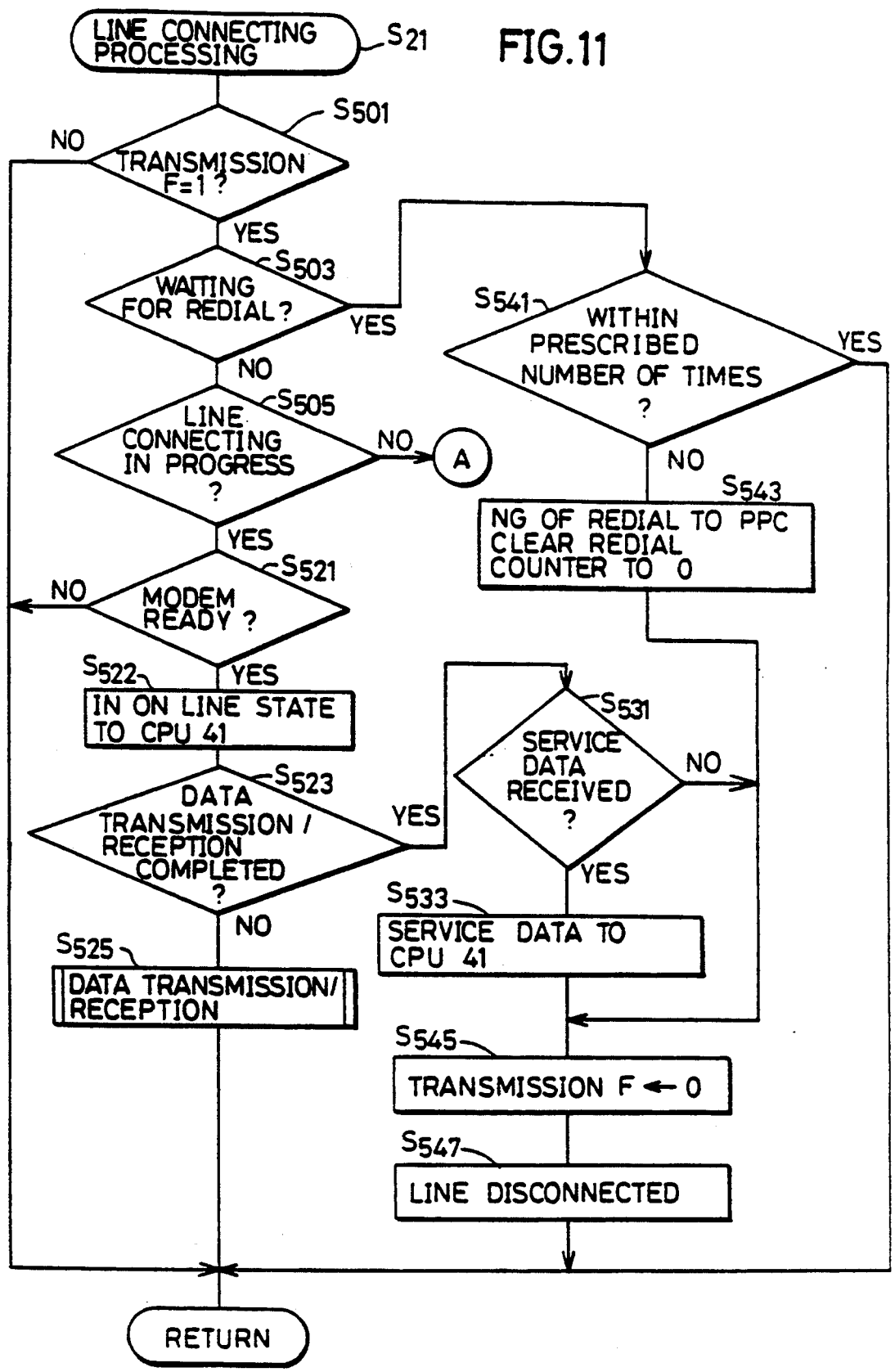
FIG. 11 is a flow chart showing a part of the specific content of a line connecting processing routine in FIG. 9.
Figure 12:
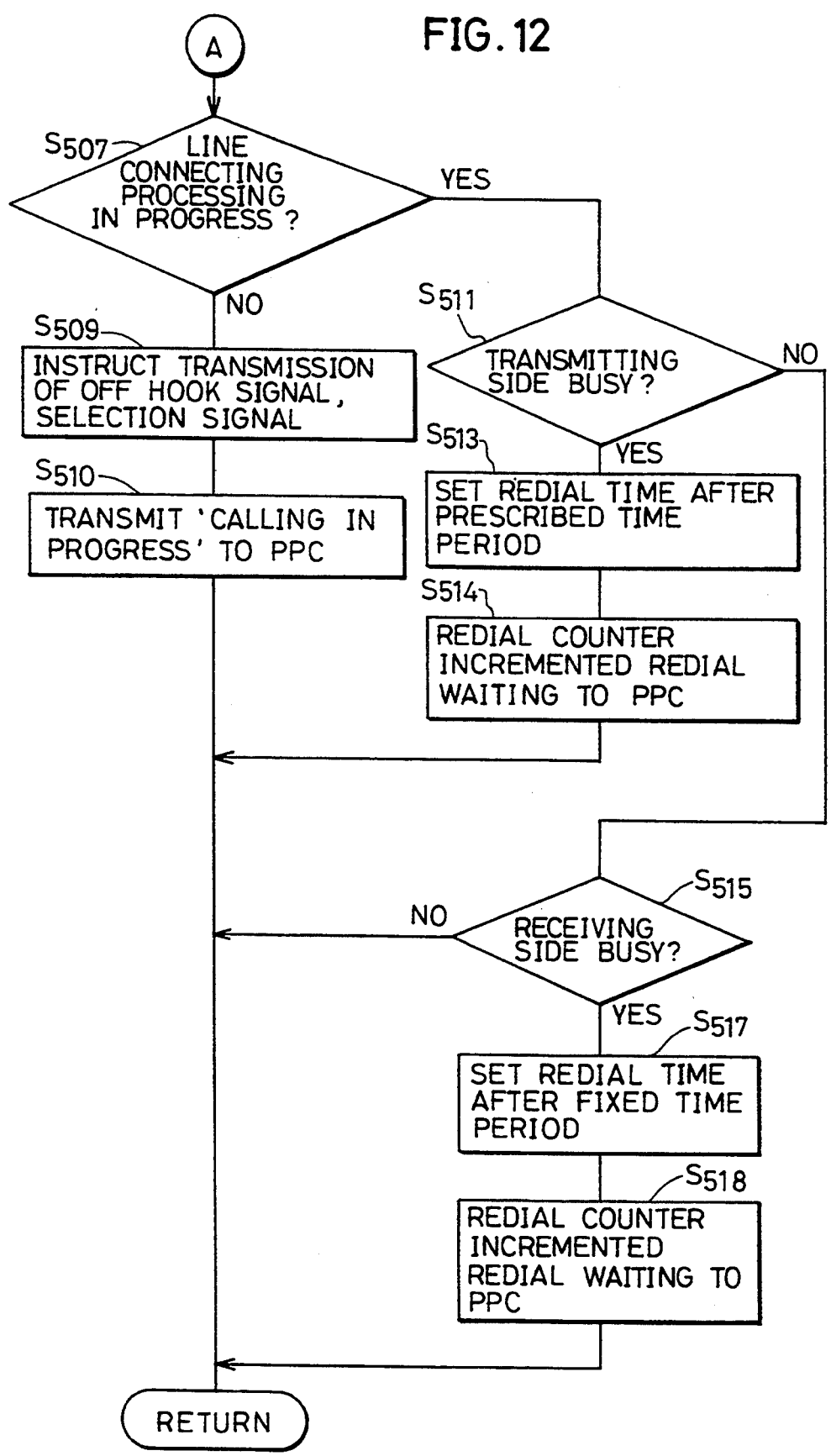
FIG. 12 is a flow chart showing the remaining part of the specific content of the line connecting processing routine in FIG. 9.

* Line Connecting Processing (FIGS. 11-13)

This processing is activated by any of the transmission flags being set to "1", and the center is called. After the center side and a communication line is connected, data corresponding to the transmission flag is transmitted to the center. Meanwhile, if the communication is made by a trouble transmission, service data such as arrival date and time of a serviceman, etc. is transmitted from the center side. If it is a communication by a fixed time transmission, a new password (updated password), etc. is transmitted.

When one of the transmission flags is set to "1" (S501;YES), an instruction of transmitting an off hook signal and the selection number signal of the modem 72 of the center is given to the modem 52, on condition that it is not waiting for re-dial (S503;NO), a communication line is not connected to the modem 72 of the center (S505;NO), and it is not in a waiting period after an instruction of calling the modem 72 of the center is given to the modem 52 (S507;NO). In other words, an instruction of calling the modem 72 on the center side is given. The fact that the calling is instructed is transmitted to the CPU 41 of the copying machine 4 (see S510/S103 in FIG. 8).

As the result of the processing in step S509, if the telephone set 53 attached to the modem 52 is busy, and, therefore, the calling of the modem 72 on the center side can not be executed (S511;YES), time after a fixed time period is set as redial time (S513). The redial counter is incremented and the fact that the data terminal is waiting for redial is transmitted to the CPU 41 of the copying machine 4 (see S514/S111 in FIG. 8). Thus, the determination in step S503 remains "YES" until the above-stated redial time, and the processing in step S509 is suspended. At the redial time, an instruction of transmitting the off hook signal and the selection number signal on the modem 72 on the center side are once again given to the modem 52 of its on (S509).

If the signals for calling the modem 72 of the center are transmitted to a communication line and it is determined that the modem 72 of the center is busy (including the case in which the telephone set 73 is busy and the case the connection is made with the modem 72 but no answer is returned from the CPU 91) (S515;YES), redial time is set as with the case described above (S517). The redial counter is incremented and the fact the data terminal is waiting for redial is transmitted to the CPU 41 of the copying machine 4 (see S518/S111 in FIG. 8). Thus, as with the above-described case, the determination in step S503 is "YES", and processing in step S509 is not executed. At the redial time, an instruction of transmitting the off hook signal and the selection number signal on the modem 72 of the center is once again given to the modem 52 (S509).

When the count value of the redial counter exceeds a prescribed value (S541;NO), an NG signal indicating that a connection with the center can not be made is transmitted to the CPU 41 of the copying machine 4, and then the count value of the redial counter is reset to "0" (see S543 and S125 in FIG. 8). The transmission flag is reset to "0" (S545), and then the communication line is disconnected (S547).

Meanwhile, when signals (an off hook signal and the selection number signal of the center) for calling the modem 72 of the center are transmitted to the communication line in response to the processing in step S509 and the communication line with the modem 72 of the center is connected (S505;YES), a transmission permission state by data transmission permission from the modem 72 is waited, and when the transmission permission state is attained (S521;YES), "in on line state with center" is transmitted to the CPU 41 of the copying machine 4 (see S522 and S111 in FIG. 8), and then data transmission/reception with the center side is executed in response to the transmission flag being set to "1" (S525).

More specifically, as illustrated in FIG. 13, if it is the case of a trouble transmission (S551;YES), trouble data indicating the kind of the trouble, etc. is transmitted to the center side, and service data (expected arrival date and time, etc. of a serviceman • see S923 in FIG. 16) transmitted from the center side is received (S552).

If it is the case of a warning transmission (S553;YES), warning data is transmitted (S554), and if it is the case of a PM transmission (S555;YES), PM data (S556) is transmitted. If it is the case of a fixed time transmission (S557;YES), various count data and element data are transmitted (S558), and the next fixed time transmission date and time data, data on updated threshold values, and an updated password are received (S559). If it is the case of a manual transmission (561;YES), various count data and element data are transmitted (S562).

Thus, when the data communication with the center side is complete (S523;YES), it is determined whether or not the service data is transmitted from the center side, and if service data such as expected arrival date and time of the serviceman, etc. is received (S531;YES), the service data is transmitted to the CPU 41 of the copying machine 4 (see S533 • S115 and S117 in FIG. 8).

Thereafter, the transmission flag is reset to "0" (S545), and the communication line is disconnected (S547).

[Processing in CPU 91 of Center]

Processings in the CPU 91 installed in the computer 90 of the center will now be described in conjunction with FIGS. 14-16.

Figure 14:
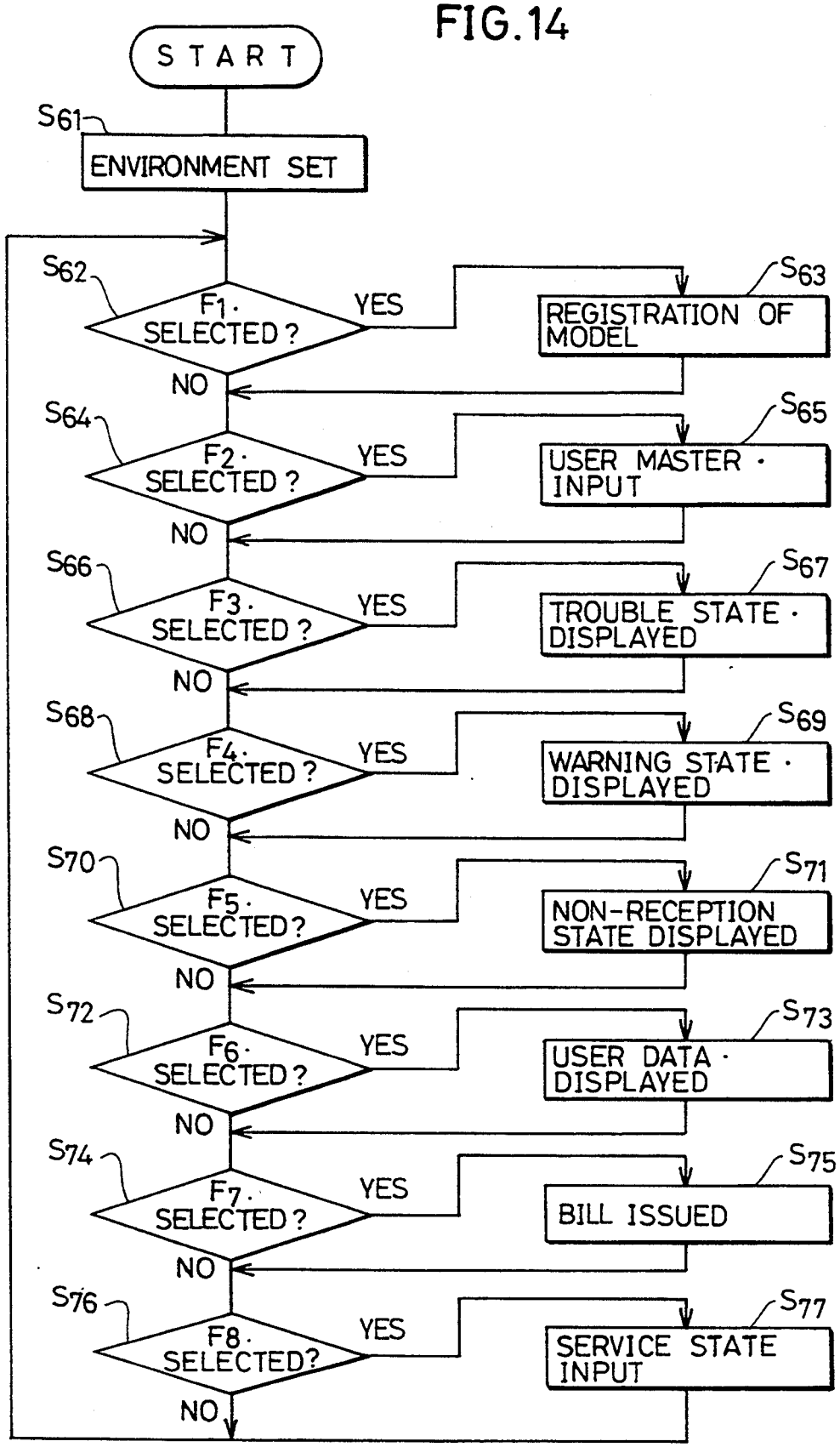
FIG. 14 is a flow chart showing one processing in a CPU at the center in the system shown in FIG. 1.

(a) F1-F8 Key Processings (FIG. 14)

In the CPU 91, a processing is initiated by turning on a power supply, and environment for the modem, the printer, etc. is set (S61). Then, the waiting state for an input operation for each of the keys F1–F8 is attained, and when a key input operation is conducted, each of the following modes is set in response to the operation or the following processing is executed.

* F1 Key Operation (S62;YES)

An acceptance mode for model registration is set (S63). More specifically, registration of a model name, the number of items of element data, the name of each item of element data, threshold values for element data, threshold values for count data, etc. is accepted.

* F2 Key Operation (S64;YES)

An acceptance mode for registration of a user master is set (S65). For example, registration of the name, address and telephone number of a user, a model name, a serial number, fixed time transmission date and time is accepted for every copying machine. The DTID of each data terminal is automatically set.

* F3 Key Operation (S66;YES)

The state of a trouble is displayed (S67). More specifically, user information (user name, address, telephone number, model name), date and time of the trouble occurrence, etc. of a copying machine on which a trouble transmission is made are displayed on the display 92 together with the content of the trouble.

It is noted that the number of troubles which took place is always displayed at a corner of the display 92 irrespective of the F3 key operation. The state of the trouble as will be described later is displayed at the time of a communication by a trouble transmission (see S923 in FIG. 16).

* F4 Key Operation (S68;YES)

The state of a warning is displayed (S69). More specifically, user information, etc. on a copying machine on which a warning transmission is made is displayed on the display 92 together with the content of the warning. It is noted that the number of warnings made is always displayed at a corner of the display 92 irrespective of the F4 key operation.

* F5 Key Operation (S70;YES)

The state of a non-reception is displayed (S71). More specifically, user information on a copying machine which does not conduct a fixed time transmission past a prescribed fixed time transmission time is displayed on the display 92. It is noted that the number of non-receptions is always displayed at a corner of the display 92 irrespective of the F4 key operation.

* F6 Key Operation (S72;YES)

A display mode for user data is attained (S73). More specifically, when a user is selected, information on the user is displayed on the display 92. If a sub menu is selected, the count values of various counters of each copying machine of the user (total counter, counter for separate paper size, a JAM counter, a trouble counter, a PM counter) and element data are displayed for every month or every item.

* F7 Key Operation (S74;YES)

A bill is printed out (S75). The printer 94 is activated, and a charge amount calculated based on the count value of the total counter and a prescribed calculation formula is printed out.

* F8 Key Operation (S76;YES)

Input of service states is accepted. More specifically, an acceptance state for inputting the schedule of each serviceman, the condition of parts stocks, and data related to making service schedules is set. The CPU 91 produces data for controlling the service schedules based on the input data and holds the data in the RAM 97.

Figure 15:
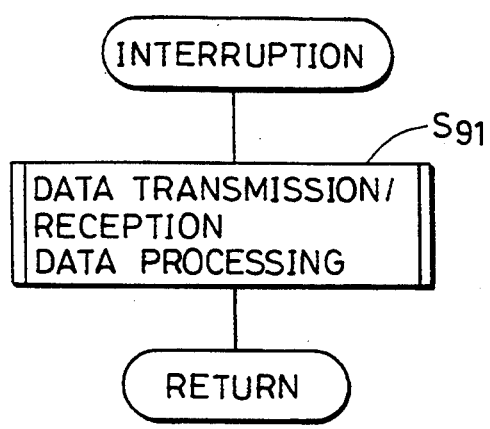
FIG. 15 is a flow chart showing other processings in the CPU at the center in the system shown in FIG. 1.

(b) Interruption Processing (FIGS. 15–16)

In the CPU 91, data transmitted from the data terminal side is received by an interruption, and the received data is subjected to a prescribed processing (S91).

When a reception from a communication line to the modem 72 is detected and an interruption takes place in the CPU 91 as a result, the DTID of the data terminal of the transmitting party and the data are received (S901). If a communication error takes place in the course of receiving them (S903;YES), the data terminal 1 side requested to re-transmit the data (S913), on condition that the number of errors is within a prescribed number (S911;YES). If the number of errors exceeds the prescribed number (S911;NO), the line is disconnected (S931) and the interruption is completed.

When the reception processing in step S901 is completed (S905;YES), it is determined whether or not the communication was a communication by a trouble transmission, and if it was a communication by a trouble transmission (S921;YES), the kind of the trouble together with the name of the user is displayed on the display 92, while service data such as the expected arrival time of a serviceman is operated based on the data for the controlling the service schedules stored in the RAM 97, and then the operated data is transmitted to the data terminal 1 (see S923/S531 in FIG. 11).

If the communication was not a communication by a trouble transmission (S921;NO), it is determined whether or not the communication was by a fixed time transmission, and if it was a communication by a fixed time transmission (S925;YES), the password of the copying machine 4 to which the data terminal 1 which made the transmission is attached is updated and transmitted (S927).

Thereafter, the communication line is disconnected (S931), calculation for each item and each month is conducted, and if necessary, an instruction to the serviceman (time for visit/parts to take with him etc.) is printed out (S933).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus controlled by a centralized control unit located at a remote site, via a communication network, comprising:

a message display;

a communication device which is connected with said communication network to call said centralized control unit and to transmit information related to said image forming apparatus to said centralized control unit;

a memory which stores a plurality of messages corresponding to states of communication between said communication device and said centralized control unit; and a controller which determines that said image forming apparatus has attained a predetermined calling condition and activates said communication device to call said centralized control unit in response to a determination result;

said controller monitoring a state of communication between said communication device and said centralized control unit after activating said communication device, selecting one of said plurality of messages stored in said memory according to the monitored state of communication and causing said message display to display the selected message.

2. An image forming apparatus as claimed in claim 1, wherein said predetermined calling condition is a problem condition.

3. An image forming apparatus as claimed in claim 1, wherein said state of communication includes a state in which said communication device is calling said centralized control unit.

4. An image forming apparatus as claimed in claim 1, wherein said state of communication includes a state in which said communication state includes a state in which said communication device is impeded from calling said centralized control unit.

5. An image forming apparatus as claimed in claim 1, wherein said state of communication includes a state in which said communication device is being connected with said centralized control unit.

6. An image forming apparatus controlled by a centralized control unit located at a remote site, via a communication network, comprising:
   an operation panel to input operational data;
   a message display provided on said operation panel;
   a communication device which is connected with said communication network to call said centralized control unit and to transmit information related to said image forming apparatus to said centralized control unit;
   a memory which stores a plurality of messages corresponding to states of communication between said communication device and said centralized control unit and problem conditions of said image forming apparatus; and
   a controller which determines that said image forming apparatus has attained a problem condition and activates said communication device to call said centralized control unit in response to a determination result;
   said controller monitoring a condition of said image forming apparatus and a state of communication between said communication device and said centralized control unit after activating said communication device, selecting one of said plurality of messages stored in said memory according to the monitored result and causing said message display to display the selected message.

7. A system comprising a plurality of image forming apparatuses and a centralized control unit which is located at a remote site to collect information transmitted from the respective image forming apparatuses through a communication network;
   each of said plurality of image forming apparatuses including:
   an operation panel to input operational data,
   a message display provided on said operation panel,
   a communication device which is connected with said communication network to call said centralized control unit,
   a memory which stores a plurality of messages corresponding to states of communication between said communication device and said centralized control unit, and
   a controller which determines that said image forming apparatus has attained a predetermined calling condition and activates said communication device in response to a determination result,
   said controller monitoring a state of communication between said communication device and said centralized control unit after activating said communication device, selecting one of said plurality of messages stored in said memory according to the monitored state of communication and causing said message display to display the selected message.

8. A system as claimed in claim 7, wherein said centralized control unit generates and transmits message data to said image forming apparatus, and said image forming apparatus controls said message display to display said message data received from said centralized control unit.

* * * * *